United States Patent [19]
Schmid et al.

[11] Patent Number: 5,320,385
[45] Date of Patent: Jun. 14, 1994

[54] SAFETY BELT PRETENSIONER IN A RESTRAINING SYSTEM FOR VEHICLE OCCUPANTS

[75] Inventors: Johannes Schmid, Schwäb.Gmünd-Hussenhofen; Thomas Mödinger, Vordersteinenberg, both of Fed. Rep. of Germany

[73] Assignee: TRW Repa GmbH, Alfdorf, Fed. Rep. of Germany

[21] Appl. No.: 8,754

[22] Filed: Jan. 25, 1993

[30] Foreign Application Priority Data

Jan. 31, 1992 [EP] European Pat. Off. ........ 92101607.7

[51] Int. Cl.⁵ .................. B60R 22/46; B60R 22/28
[52] U.S. Cl. ............................. 280/805; 280/807
[58] Field of Search ............... 280/806, 805, 807; 297/480; 180/274

[56] References Cited

U.S. PATENT DOCUMENTS

| | | |
|---|---|---|
| 3,942,819 | 3/1976 | Schwanz et al. |
| 4,597,545 | 7/1986 | Burghardt ............ 280/806 |
| 4,884,652 | 12/1989 | Vollmer ............... 280/806 |

FOREIGN PATENT DOCUMENTS

| | | |
|---|---|---|
| 0237503 | 9/1987 | European Pat. Off. |
| 0264016 | 4/1988 | European Pat. Off. |
| 2223061 | 11/1973 | Fed. Rep. of Germany |
| 3229260 | 2/1984 | Fed. Rep. of Germany |
| 3331696 | 8/1984 | Fed. Rep. of Germany |
| 3249729 | 5/1990 | Fed. Rep. of Germany |

*Primary Examiner*—Karin L. Tyson
*Attorney, Agent, or Firm*—Tarolli, Sundheim & Covell

[57] ABSTRACT

A safety belt pretensioner in a restraining system for vehicle occupants includes a reel (54) which is provided with a slot (58) for the passage of the webbing (16) and which comprises a toothing (56) at its outer periphery. The reel (54) is arranged loosely between toothings (42, 44, 52) arranged opposite spaced apart from each other on two opposing spaced apart parallel plates (20d, 40). One of said plates forms a drive plate (40) which is displaceable along the bottom wall (20c) of a frame (20) to which the other plate (20d) is secured as cover plate. A return brake for diminishing energy peaks in the webbing system is formed by a torsion bar (32) on which a gear (34) is mounted via an overrunning clutch (36). The gear (34) is in engagement with a toothing (46) of the drive plate (40). A linear drive engages the drive plate (40) for moving the drive plate (40).

7 Claims, 3 Drawing Sheets

SAFETY BELT PRETENSIONER IN A RESTRAINING SYSTEM FOR VEHICLE OCCUPANTS

BACKGROUND OF THE INVENTION

The invention relates to a safety belt pretensioner in a restraining system for vehicle occupants. In a safety belt pretensioner known from German patent specification 3,249,729, a rotatable reel has a slot for the passage of the belt webbing. The reel is provided at its outer periphery with a toothing frame which is adapted to be mounted on the vehicle bodywork comprises a first wall having a toothing along which the toothing of the reel can roll in meshing engagement. A linear drive which is activatable by a collision of the vehicle transmits linear movement to the reel for conversion into a rotary movement of the reel. This pretensioner has the advantage that a conventional belt retractor can be employed in the safety belt restraining system. Integration into existing systems is relatively easy because the webbing path remains unchanged.

SUMMARY OF THE INVENTION

The present invention provides a safety belt pretensioner wherein for a given stroke of the available linear drive a tightening of the webbing by relatively large length of webbing is achieved with only a few components which are easy to make and which can be assembled easily in order to make available a system which is economical as a whole.

In a safety belt pretensioner of the present invention a drive plate is displaceably arranged along a wall of the frame and comprises on its side facing the reel a toothing with which the toothing of the reel is in meshing engagement, and the linear drive engages the drive plate. In the belt pretensioner according to the invention the linear movement of the linear drive is converted into a rotary movement of the reel with a relatively large angle of rotation. As a result, for a given stroke of the linear drive a belt tightening takes place over a relatively large webbing length. This is particularly favourable when the linear drive is derived from a vehicle component which undergoes a displacement relatively to the passenger compartment, assumed to be rigid, when a vehicle collision takes place. The movement of this vehicle component can be transferred by means of a pulling cable to the drive plate. Even a slight displacement of this vehicle component then leads to the desired belt tightening.

A particularly advantageous further development of the belt pretensioner resides in that after the belt tightening the reel is inhibited in its return rotation by a return brake. Preferably, the braking force of said return brake is dimensioned for an energy conversion diminishing load peaks. Such a return brake suitable for the energy conversion can be achieved with a few economical and easily assemblable components in that a torsion bar held non-rotatably on the housing is plastically deformed by the relative movement between the housing and drive plate. A gear is mounted on said torsion bar by means of an overrunning clutch. The gear engages in meshing manner into a toothing arranged on the drive plate so that after the belt tightening a return of the reel in the belt withdrawal direction can take place only under torsion and corresponding plastic deformation of the torsion bar.

BRIEF DESCRIPTION OF THE DRAWINGS

Further features and advantages of the invention will be apparent from the following description of an advantageous embodiment and from the drawings, to which reference is made in which.

DESCRIPTION OF THE PREFERRED EMBODIMENT

Figure 1:
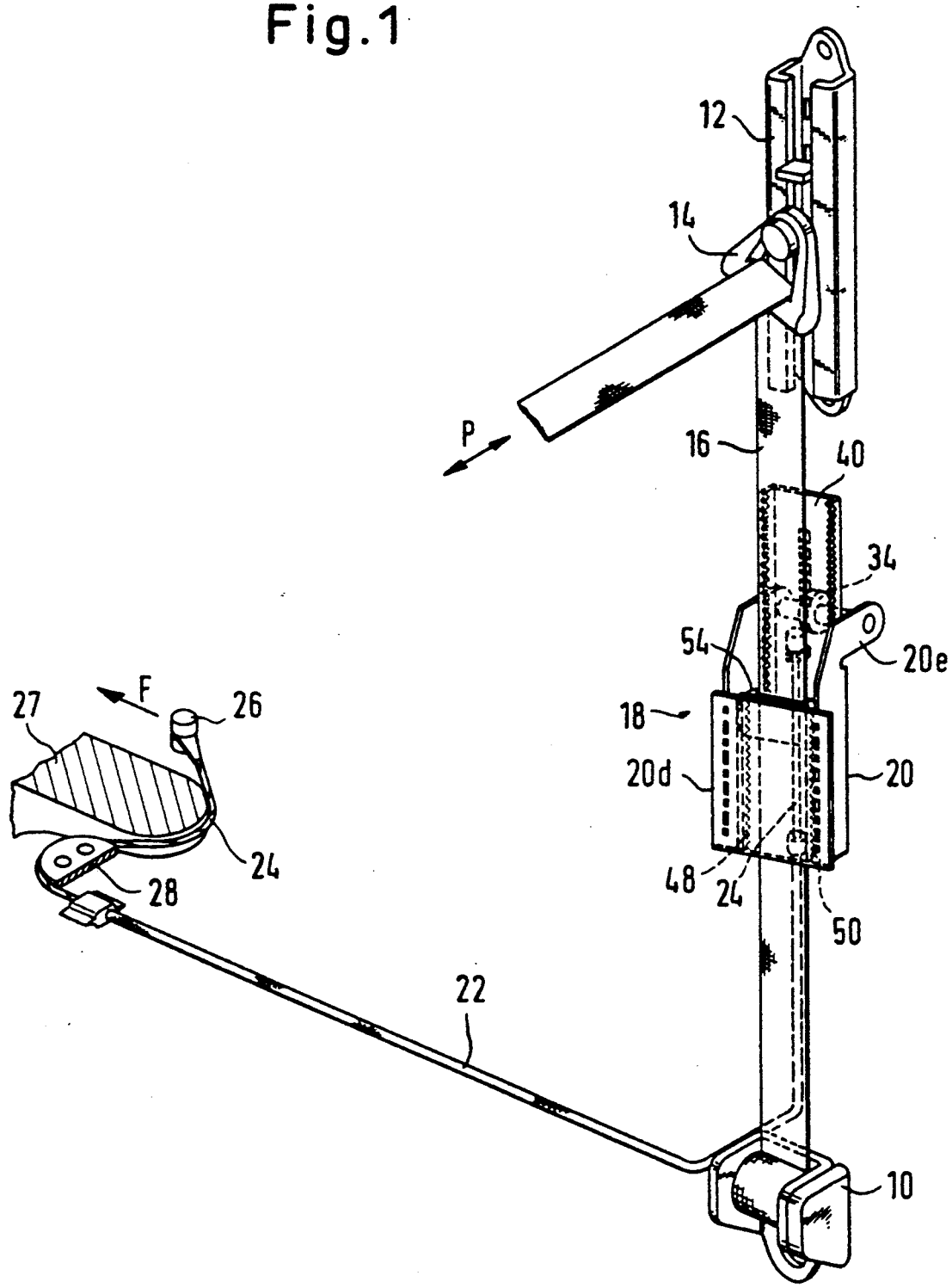
FIG. 1 shows a schematic perspective view of essential parts of a safety belt restraining system having a belt pretensioner according to the invention.

The safety belt restraining system for vehicle occupants shown in FIG. 1 is provided in conventional manner with a belt retractor 10 and vehicle adjuster 12 for a deflection fitting 14 which provides deflection towards the upper part of the body of a vehicle occupant. A belt pretensioner 18 is arranged at the webbing portion extending approximately perpendicularly between the belt retractor 10 and the vertical adjuster 12. A loadbearing frame 20 of said belt pretensioner is rigidly secured to the vehicle bodywork. A sheathed cable having an outer sheath 22 and an inner pulling cable 24 extends between the belt tightener 18 and an anchoring point 26 on the vehicle bodywork; in the vicinity of this anchoring point 26 the pulling cable 24 is partially led round a vehicle component 27 and deflected via a deflecting element 28 through about 180°. The vehicle component 27 is movable relative to the vehicle bodywork during a vehicle collision. Upon relative movement of the vehicle component 27, the vehicle component 27 moves the pulling cable 24. The travelling direction is indicated in FIG. 1 by an arrow F. The webbing withdrawal direction and the webbing retraction direction are indicated in FIG. 1 by a double arrow P.

Except for the belt pretensioner which will now be described in detail the safety belt restraining system is of conventional construction and will therefore not be further explained.

Figure 2:
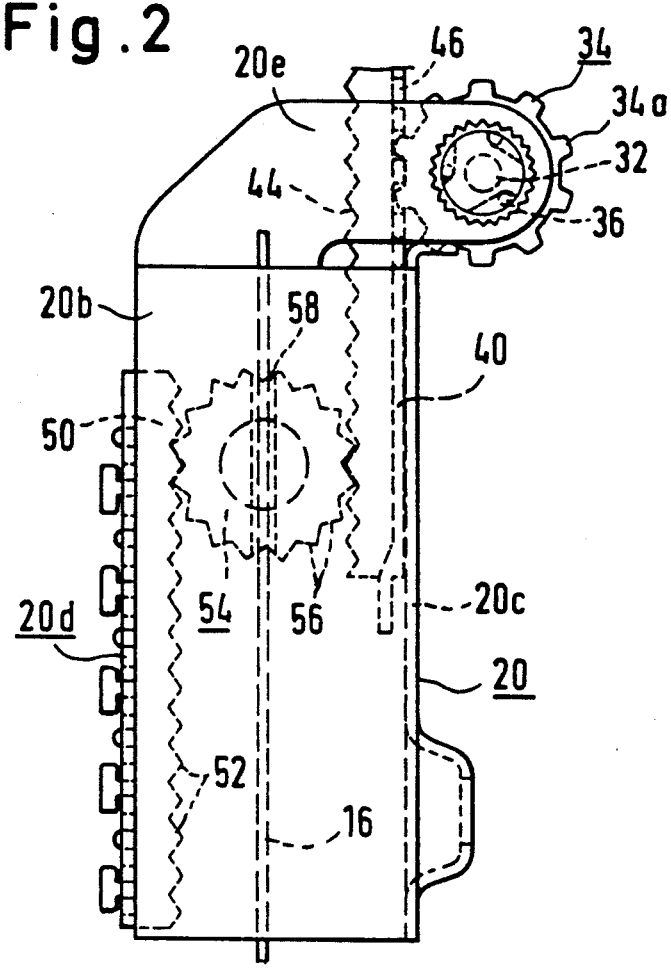
FIG. 2 shows a schematic side view of the belt pretensioner shown in FIG. 1.
Figure 3:
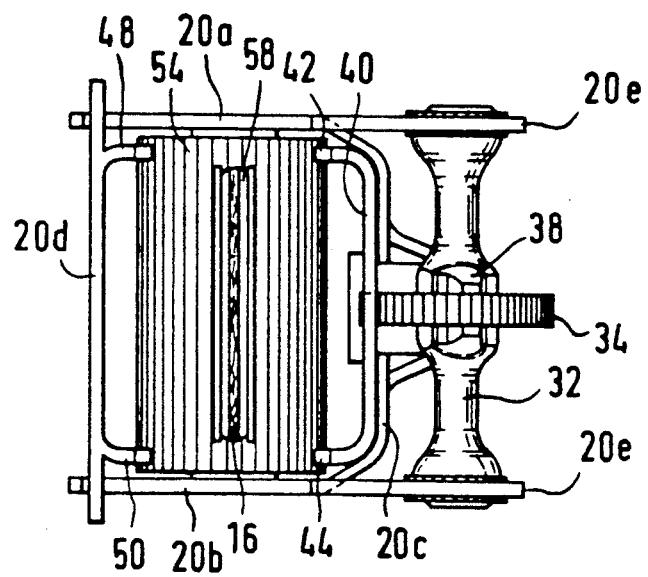
FIG. 3 shows a schematic end view of the belt pretensioner.
Figure 4:
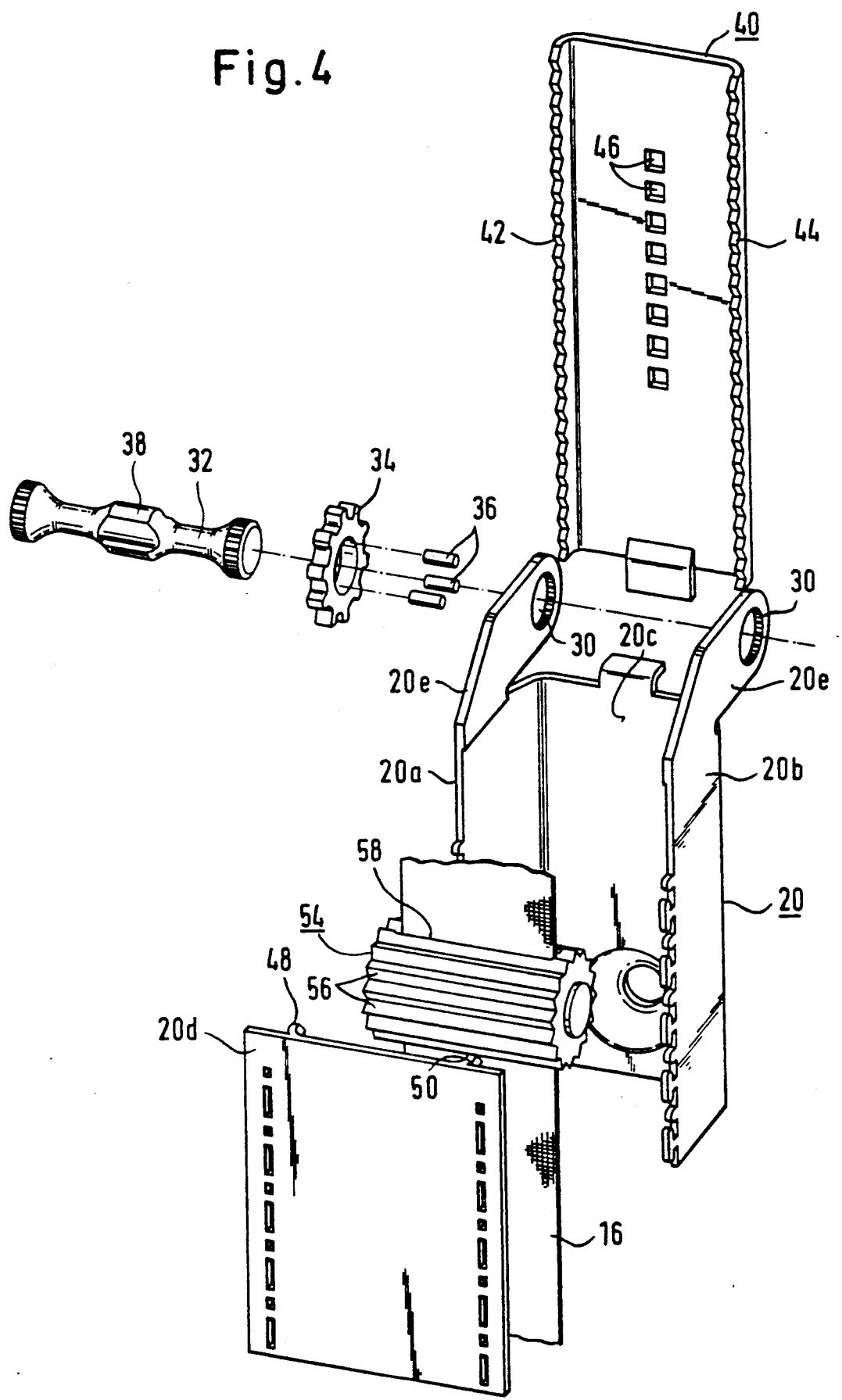
FIG. 4 is an exploded perspective view of the belt pretensioner.

The loadbearing frame 20 of the belt pretensioner 18 consists of a body which is bent in U-shaped manner and has two side walls 20a, 20b and a bottom wall 20c. The frame is closed on its side opposite the bottom wall 20c by a cover plate 20d connected to the free ends of the side walls 20a, 20b. The symmetrically formed side walls 20a, 20b are each provided with a bracket 20e which extends beyond the rear side of the bottom wall 20c. Each of the brackets 20e is provided with a knurled opening 30 into which in each case one end of the torsion bar 32 is inserted in non-rotatable manner with an interference fit. A gear 34 is mounted on said torsion bar 32 by means of an overrunning clutch. As best apparent from FIG. 2, said overrunning clutch is formed by a roller body blocking mechanism, the roller bodies 36 of which are arranged in ramp-like recesses of a bearing body 38 in the centre of the torsion bar 32. The roller bodies 36 are surrounded by the cylindrical inner wall of a bore of the gear 34.

A drive plate 40 is arranged displaceably along the bottom wall 20c of the frame 20 and carries at each of its two side edges a toothing 42 and 44 respectively. Along its centre line the drive plate 40 is provided with a row of openings 46 which form a further toothing which is made to match the toothing at the outer periphery of the gear 34. As particularly clearly apparent from FIG. 2, the teeth 34a of the gear 34 are in engagement with this toothing of the drive plate 40 formed by the openings 46.

The cover plate 20d is provided on its side facing the bottom wall 20c with two parallel ribs 48, 50 which each form a rack with a toothing 52 corresponding to the toothings 42, 44. Between said toothings 52 on the one hand and the toothings 42, 44 on the other a roll-like reel 54 provided at its outer periphery with a toothing 56 is arranged loosely and in meshing engagement with said toothings. The reel 54 is provided with a diametrically through slot for the passage of the webbing 16.

As apparent from FIG. 1, the pulling cable 24 is connected to the drive plate 40. The outer sheath 22 of the sheathed cable is supported on the frame 20. Together with the achoring point 26, the deflecting element 28 and the vehicle component 27 partially surrounded by the pulling cable 24, said sheathed cable forms a linear drive for the belt tightener. Thus, the movable vehicle component 27, the anchoring point 26, the deflecting element 28 and the sheathed cable, which includes the outer sheath 22 and the inner pulling cable 24, define the linear drive for the belt pretensioner.

In vehicle collision the vehicle component 27 is displaced relatively to the anchoring point 26 opposite to the direction of the arrow F. A tension therefore arises at the pulling cable 24. This tension is transmitted to the drive plate 40. The drive plate 40 therefore moves along the bottom wall 20c in the direction in which the tension is exerted. Since the reel 54 is in meshing engagement via its toothing 56 with the toothings 42, 44 of the drive plate 40, it is set in rotation. Since however at the same time it is in meshing engagement with the toothings 52 along the ribs 48, 50 of the cover plate 20d, it is rolled along said toothings 52. It therefore moves along said toothings 52 downwards. At the same time the webbing 16 is wound onto the periphery thereof. Due to the winding of the webbing 16 on the periphery of the reel 54 the webbing section between the belt tightener 18 and the anchoring point of the webbing to the vehicle floor or vehicle seat is shortened. This is the desired tightening of the belt webbing. The overrunning clutch formed by the roller body clamping mechanism with the roller bodies 36 allows free rotation of the gear 34 downwardly during the movement of the drive plate 40. The downward movement of the drive plate 40 is thus not obstructed by the freely entrained gear 34.

After completion of the belt tightening said overrunning clutch however is reversed by the tension which is now present in the webbing system and which tends to turn the reel 54 in the reverse direction. The return rotation of the reel is now inhibited because it is possible only when the drive plate 40 in turn performs a displacement along the bottom wall 20c of the frame 20 in the upward direction. This upward movement of the drive plate 40 is however obstructed via the gear 34, the now blocking overrunning clutch at the torsion bar 32 held non-rotatably between the brackets 20e of the frame 20. A further displacement of the drive plate 40 is possible only if the torsion bar 32 undergoes a torsion. This torsion involves a plastic deformation so that a conversion of energy takes place. This energy conversion is highly desirable because it effects a diminishing of the load peaks in the webbing system. On suitable choice of the material from which the torsion bar 32 is made rotation of the gear 34, and with the latter the centre bearing body 30 of the torsion bar, through more than 360° can take place. This corresponds to an almost complete reverse rotation of the reel 54 into its starting position. Further energy conversion then takes place by tightening of the webbing coil on the belt retractor 10.

In the embodiment described, the force for the linear drive of the belt tightener is derived from the vehicle component 27 which shifts relatively to the rigid passenger compartment of the vehicle when the latter is in a collision and pulls the inner cable 24 across the deflection element 28.

What is claimed is:

1. In a safety belt passenger restraint system for vehicles comprising:
   a belt retractor for coiling and uncoiling of belt webbing;
   a belt webbing deflection fitting;
   and a safety belt;
   a belt pretensioning device engaging, in operation, a section of belt webbing extending between said retractor and said fitting, said pretensioning device comprising:
   a reel mounted in a frame, said frame being adapted to be mounted on a vehicle bodywork, and said reel having a slot for the passage belt webbing,
   a linear drive activatable by a vehicle collision,
   a first rack member affixed to a first wall of said frame,
   and a second rack member provided on a plate slidably mounted in said frame adjacent to a second wall of said frame opposite said first wall,
   said reel having a peripheral toothing and being arranged between said first and second rack members in meshing engagement with both of said rack members,
   and said linear drive engaging said plate to move said plate and thereby rotate said reel, said reel, when rotating, coiling a portion of belt webbing and rolling along said first rack member.

2. The pretensioning device of claim 1, wherein said reel is loosely engaged between said first and second rack members.

3. The pretensioning device of claim 1, wherein inhibiting means are associated with said reel to inhibit rotation of said reel in an uncoiling direction after rotation in a coiling direction.

4. The pretensioning device of claim 1, wherein said inhibiting means develops an inhibiting force preventing rotation of said reel up to a predetermined level of force occurring in the belt webbing and upon exceeding of said level permitting rotation of said reel in the uncoiling direction against resistance dimensioned for absorption of load peaks in said belt webbing.

5. The pretensioning device of claim 4, wherein said inhibiting means comprise:
   a rod mounted in said frame fixed against rotation;
   a gear rotatably mounted on said rod and having teeth meshing with a series of openings provided in said plate;
   and an overrunning coupling arranged between said gear and said rod.

6. The pretensioning device of claim 5, wherein said rod has at least one section forming a torsion bar which twists under load and undergoes plastic deformation.

7. The pretensioning device of claim 1, wherein said linear drive includes a vehicle component which moves relatively to the vehicle bodywork in a vehicle collision, a cable having a first end connected to said plate and a second end connected to the vehicle bodywork, and said cable having a section which partially surrounds said component.

* * * * *